(12) United States Patent
Yun et al.

(10) Patent No.: US 9,030,450 B2
(45) Date of Patent: May 12, 2015

(54) DISPLAY APPARATUS AND METHOD OF DISPLAYING THREE-DIMENSIONAL IMAGE USING THE SAME

(75) Inventors: Hae-Young Yun, Suwon-Si (KR); Kyung-Ho Jung, Yongin-Si (KR); Seung-Jun Jeong, Hwaseong-Si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 276 days.

(21) Appl. No.: 13/547,639

(22) Filed: Jul. 12, 2012

(65) Prior Publication Data

US 2013/0176203 A1 Jul. 11, 2013

(30) Foreign Application Priority Data

Jan. 11, 2012 (KR) ........................ 10-2012-0003467

(51) Int. Cl.
*G02B 27/00* (2006.01)
*G02B 27/22* (2006.01)
*H04N 13/04* (2006.01)

(52) U.S. Cl.
CPC ........ *G02B 27/2214* (2013.01); *G02B 27/0093* (2013.01); *H04N 13/0404* (2013.01); *H04N 13/0468* (2013.01)

(58) Field of Classification Search
None
See application file for complete search history.

(56) References Cited

U.S. PATENT DOCUMENTS

| | | | | |
|---|---|---|---|---|
| 8,482,597 B2 * | 7/2013 | Son et al. | ......................... | 348/42 |
| 8,547,487 B2 * | 10/2013 | Chang et al. | ..................... | 349/15 |
| 8,681,075 B2 * | 3/2014 | Uehara | ............................ | 345/32 |
| 2007/0035672 A1 | 2/2007 | Shetak et al. | | |
| 2011/0122329 A1 * | 5/2011 | Broughton et al. | ............. | 349/15 |

FOREIGN PATENT DOCUMENTS

| JP | 2005-128522 | 5/2005 |
|---|---|---|
| KR | 10-2009-0056032 | 6/2009 |

OTHER PUBLICATIONS

English Abstract for Publication No. 2005-128522, May 19, 2005.
English Abstract for Publication No. 10-2009-0056032, Jun. 3, 2009.

* cited by examiner

*Primary Examiner* — Joseph Haley
(74) *Attorney, Agent, or Firm* — F. Chau & Associates, LLC (57) ABSTRACT

A display apparatus includes a display panel and a liquid crystal lens. The display panel includes a first pixel displaying an N-th portion of a left image corresponding to an N-th position in the left image and a second pixel displaying an N-th portion of a right image corresponding to the N-th position in the right image. The second pixel is spaced apart from the first pixel with additional pixels disposed between the second and first pixels. The liquid crystal lens includes a unit lens directing the N-th left image to a left eye of an observer and the N-th right image to a right eye of the observer where N is a positive integer.

25 Claims, 6 Drawing Sheets

DISPLAY APPARATUS AND METHOD OF DISPLAYING THREE-DIMENSIONAL IMAGE USING THE SAME

CROSS-REFERENCE TO RELATED APPLICATION

This application claims priority to Korean Patent Application No. 10-2012-0003467, filed on Jan. 11, 2012, under 35 U.S.C. §119, the contents of which are herein incorporated by reference in their entireties.

TECHNICAL FIELD

Exemplary embodiments of the present invention relate to a display apparatus and a method of displaying a three-dimensional ("3D") image using the display apparatus. More particularly, exemplary embodiments of the present invention relate to a display apparatus having a high display quality and a method of displaying a 3D image using the display apparatus.

DISCUSSION OF THE RELATED ART

Generally, a liquid crystal display apparatuses displays two-dimensional ("2D") images. Recently, as a demand for displaying a 3D image has increased within the video game and movie industries, liquid crystal display apparatuses have been developed to display 3D images.

Most display apparatuses capable of displaying 3D images are referred to as stereoscopic image display apparatuses as they are capable of providing, to the viewer, distinct left-eye and right eye images. Generally, a stereoscopic image display apparatus displays the 3D image by relying upon a phenomenon known as binocular parallax by which humans are able to perceive depth of vision by viewing objects from distinct angles between their left and right eye owing to the space between the two eyes. As the two eyes of a human are spaced apart from each other, the left eye and right eye provide to the brain distinct images viewed at different angles. The human brain mixes the two images so that an observer may recognize depth within the 3D image.

The stereoscopic image display device may be divided into a stereoscopic type and an auto-stereoscopic type depending on whether a viewer is required to wear 3D glasses in order to perceive the 3D image. The stereoscopic type may include an anaglyph type and a shutter glass type and so on. The auto-stereoscopic type may include a barrier type, a lenticular type, a liquid crystal lens type and a liquid crystal barrier type.

In the liquid crystal lens type, the display device may be placed into a 2D mode for displaying 2D images by turning off the liquid crystal lens so that an image on the display panel is not refracted. Thus, a viewer may recognize the 2D image. The display may also be placed into a 3D mode for displaying 3D images by turning on the liquid crystal lens so that an image on the display panel is refracted. Thus, the viewer may recognize the 3D image.

When the image on the display panel is refracted by the liquid crystal lens in the 3D mode, it is possible that, a portion of the image is not properly refracted so that to some extent, a left image is shown in a right eye and/or a right image is shown in a left eye. This phenomenon may be referred to as crosstalk. Due to the crosstalk, a display quality of the 3D image may be deteriorated.

SUMMARY

Exemplary embodiments of the present invention provide a display apparatus displaying a three-dimensional ("3D") image with a high display quality.

Exemplary embodiments of the present invention provide a method of displaying the 3D image using the display apparatus.

In an exemplary embodiment of a display apparatus according to the present invention, the display apparatus includes a display panel and a liquid crystal lens. The display panel includes a first pixel displaying an N-th left image corresponding to an N-th position in a left image and a second pixel displaying an N-th right image corresponding to the N-th position in a right image. The second pixel is spaced apart from the first pixel. The liquid crystal lens includes a unit lens transmitting the N-th left image to a left eye of an observer and the N-th right image to a right eye of the observer. Here N is a positive integer.

According to an exemplary embodiment, a pixel cycle is a distance between pixels adjacent to each other in a first direction. The second pixel may be spaced apart from the first pixel by 2K+1 pixel cycles where K is a positive integer.

According to an exemplary embodiment, a range of a magnification M of the unit lens may be $$\frac{IPD}{\left(2K+1+\frac{2}{3}\right)P} \leq M \leq \frac{IPD}{\left(2K+1-\frac{2}{3}\right)P}.$$

Where IPD is a distance between the left eye and the right eye of the observer and P is the pixel cycle.

According to an exemplary embodiment, the magnification M of the unit lens may be $$M = \frac{IPD}{(2K+1)P}.$$

According to an exemplary embodiment, a focal length f of the unit lens may be proportional to $$\frac{D}{M+1}$$

where D is a distance from the left and right eyes of the observer to the liquid crystal lens.

According to an exemplary embodiment, a lens cycle is a distance between the unit lenses adjacent to each other in the first direction. A range of the lens cycle PL may be $$2P\frac{M}{M+2} \leq PL \leq 2P\frac{3M}{3M+2}.$$

According to an exemplary embodiment, the tens cycle PL may be $$PL = 2P\frac{M}{M+1}.$$

According to an exemplary embodiment, the display apparatus may further include a substrate disposed between the display panel and the liquid crystal lens. A thickness d of the substrate may be proportional to $$Nm\frac{D}{M}$$

where Nm is a refractive index of the substrate.

According to an exemplary embodiment, the display panel may further include a third pixel adjacent to the first pixel. The third pixel may display an (N−1)-th right image corresponding to an (N−1)-th position in the right image.

According to an exemplary embodiment, the display panel may further include a third pixel adjacent to the first pixel. The third pixel may display an (N−2)-th right image corresponding to an (N−2)-th position in the right image.

According to an exemplary embodiment, the display panel may further include a third pixel adjacent to the first pixel. The third pixel may display an (N−3)-th right image corresponding to an (N−3)-th position in the right image.

According to an exemplary embodiment, the unit lens may be a Fresnel lens including a plurality of divided lens areas. Each lens area may include a plurality of lens electrodes.

According to an exemplary embodiment, the display apparatus may further include a viewpoint detecting part detecting a viewpoint of the observer.

A method of displaying a 3D image according to an exemplary embodiment of the present invention includes displaying an N-th left image corresponding to an N-th position in a left image on a first pixel and displaying an N-th right image corresponding to the N-th position in a right image on a second pixel, transmitting the N-th left image to a left eye of an observer by a unit lens and transmitting the N-th right image to a right eye of the observer by the unit lens. The second pixel is spaced apart from the first pixel. Here N is a positive integer.

According to an exemplary embodiment, a pixel cycle is a distance between pixels adjacent to each other in a first direction. The second pixel may be spaced apart from the first pixel by 2K+1 pixel cycles where K is a positive integer.

According to an exemplary embodiment, a range of a magnification M of the unit lens may be $$\frac{IPD}{\left(2K+1+\frac{2}{3}\right)P} \le M \le \frac{IPD}{\left(2K+1-\frac{2}{3}\right)P}$$

where IPD is a distance between the left eye and the right eye of the observer and P is the pixel cycle.

According to an exemplary embodiment, the magnification M of the unit lens may be $$M = \frac{IPD}{(2K+1)P}.$$

According to an exemplary embodiment, a focal length f of the unit lens is proportional to $$\frac{D}{M+1}$$

where D is a distance from the left and right eyes of the observer to the liquid crystal lens.

According to an exemplary embodiment, a lens cycle is a distance between the unit lenses adjacent to each other in the first direction. A range of the lens cycle PL may be $$2P\frac{M}{M+2} \le PL \le 2P\frac{3M}{3M+2}.$$

According to an exemplary embodiment, the lens cycle PL may be $$PL = 2P\frac{M}{M+1}.$$

According to an exemplary embodiment, the unit lens may be a Fresnel lens including a plurality of divided lens areas. Each lens area may include a plurality of lens electrodes.

According to an exemplary embodiment, the method may further include detecting a viewpoint of the observer and adjusting the left image and the right image based on viewpoint data of the observer.

According to a display apparatus and a method of displaying the 3D image using the display apparatus, the display panel includes a first pixel displaying an N-th left image and a second pixel spaced apart from the first pixel. An N-th right image is displayed so that the crosstalk may be prevented. Thus, the display quality of the 3D image may be increased.

According to an exemplary embodiment of the present invention a display device includes a display panel including a plurality of pixels displaying a plurality of frames of a three-dimensional image comprising a left-eye image and a right-eye image. A pixel of the plurality of pixels displaying a portion of the left-eye image for a given frame is spaced apart from a pixel of the plurality of pixels displaying a corresponding portion of the right-eye image for the given frame such that one or more additional pixels disposed between the pixel displaying the portion of the left-eye image for the given frame and the pixel displaying the corresponding portion of the right-eye image for the given frame. The display device further includes a liquid crystal lens directing the left-eye image to a left eye of a viewer and directing the right-eye image to a right eye of the viewer.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION

Hereinafter, exemplary embodiments of the present invention will be described in further detail with reference to the accompanying drawings.

Figure 1:
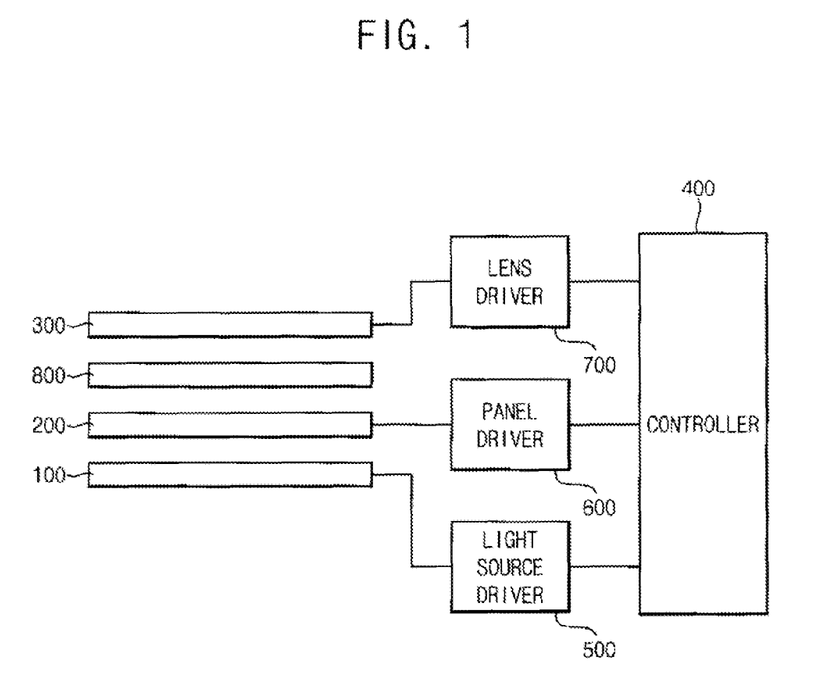
FIG. 1 is a block diagram illustrating a display apparatus according to an exemplary embodiment of the present invention.
Figure 2:
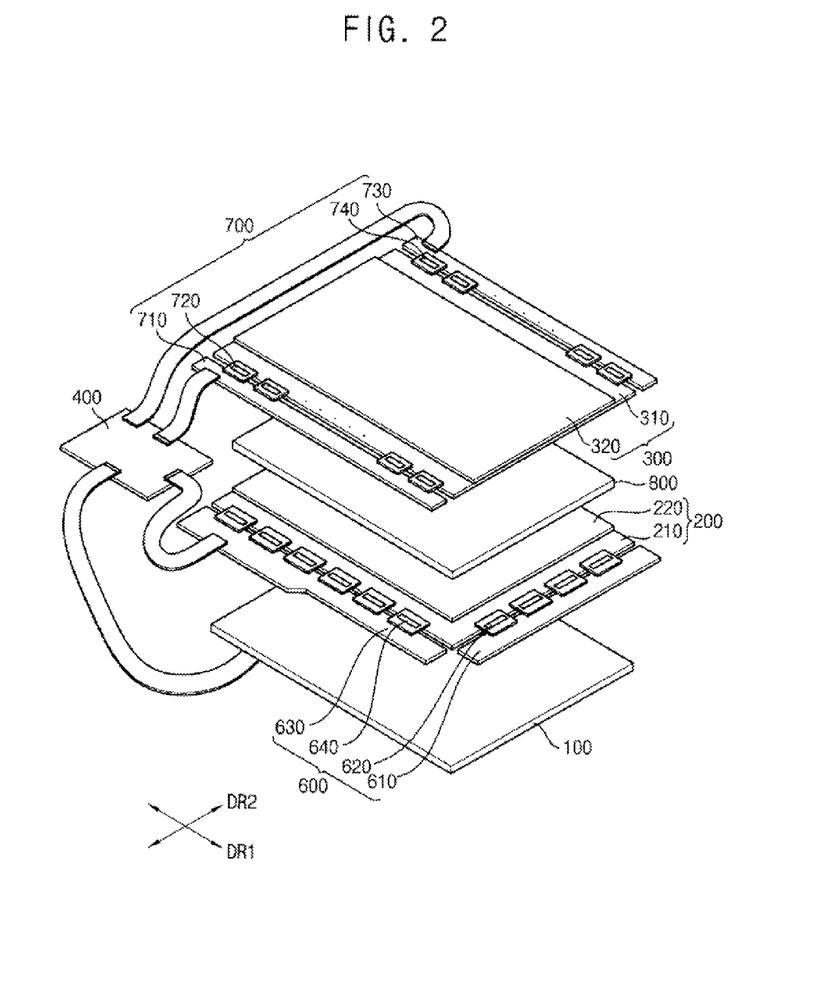
FIG. 2 is an exploded perspective view illustrating the display apparatus of FIG. 1.

FIG. 1 is a block diagram illustrating a display apparatus according to an exemplary embodiment of the present invention. FIG. 2 is an exploded perspective view illustrating the display apparatus of FIG. 1.

Referring to FIGS. 1 and 2, the display apparatus includes a light source module, a display panel module and a liquid crystal lens module. The light source module includes a light source part 100, light source controller (not shown) and a light source driver 500. The display panel module includes a display panel 200, a panel controller (not shown) and a panel driver 600. The liquid crystal lens module includes a liquid crystal lens 300, a lens controller (not shown) and a lens driver 700.

The display apparatus includes the light source part 100, the display panel 200, the liquid crystal lens 300, a controller 400, the light source driver 500, the panel driver 600, the lens driver 700 and a substrate 800.

The light source part 100 provides light to the display panel 200. The light source part 100 includes a light source generating light. For example, the light source may include a cold cathode fluorescent lamp ("CCFL"), an external electrode fluorescent lamp ("EEFL"), a flat fluorescent lamp ("FFL"), and/or a light emitting diode ("LED"). The light source part 100 may be a backlight assembly.

The light source part 100 may be a direct type light source part which is disposed under the display panel 200 to provide light to the display panel 200. Alternatively, the light source part 100 may be an edge type light source part which is disposed at to an edge of the display panel 200 to provide light to the display panel 200. When the light source part 100 is the edge type light source part, the light source part 100 may further include a light guide plate (not shown).

The display panel 200 is disposed on the light source part 100. The display panel includes a first panel substrate 210, a second panel substrate 220 and a panel liquid crystal layer (not shown) disposed between the first and second panel substrates 210 and 220.

The display panel 200 includes a plurality of gate lines (not shown), a plurality of data lines (not shown) and a plurality of pixels connected to the gate lines and the data lines.

Each of the plurality of pixels includes a switching element (not shown), a liquid crystal capacitor (not shown) and a storage capacitor (not shown) which are electrically connected to the switching element.

The gate lines, the data lines, pixel electrodes (not shown) and storage electrodes (not shown) are disposed on the first panel substrate 210. A panel common electrode is disposed on the second panel substrate 220.

The display panel 200 may display a 2D image in a 2D mode. The display panel 200 may display a 3D image in a 3D mode.

An image rendered on the pixels of the display panel 200 in the 3D mode is explained in detail below with reference to FIG. 3.

The liquid crystal lens 300 is disposed on the display panel 200. The liquid crystal lens 300 includes a first lens substrate 310, a second lens substrate 320 and a lens liquid crystal layer (not shown) disposed between the first and second lens substrates 310 and 320.

The liquid crystal lens 300 includes a plurality of unit lenses. Each of the plurality of unit lenses is disposed in the first direction DR1. Each of the unit lenses extends in a second direction DR2 crossing the first direction DR1. Alternatively, each of the unit lenses may extend in a direction at an angle with respect to the second direction DR2.

For example, the unit lens may be a Fresnel lens having a plurality of divided lens areas. Each of the lens areas may include a plurality of lens electrodes.

The lens electrodes are disposed on the first lens substrate 310 and a lens common electrode is disposed on the second lens substrate 320. Alternatively, the lens common electrode may be disposed on the first lens substrate 310 and the lens electrodes may be disposed on the second lens substrate 320.

The lens electrodes and the lens common electrode may include an Indium Zinc Oxide ("IZO").

When a driving voltage is applied to the lens electrodes and the lens common electrode, an arrangement of liquid crystal molecules of the lens liquid crystal layer is adjusted so that the liquid crystal lens 300 has a refractive distribution as a lens.

The liquid crystal lens 300 is driven in the 2D mode or the 3D mode. For example, in the 2D mode, the liquid crystal lens 300 passes an image provided from the display panel 200 without refraction. Thus, an observer views the 2D image.

In the 3D mode, the liquid crystal lens 300 functions as a lens so that the liquid crystal lens 300 refracts an image provided from the display panel 200. Thus, an observer views the 3D image.

The controller 400 receives input image data, input lens data and input control signal from an outside source.

The input image data may include 2D image data and 3D image data. The input image data may include red image data, green image data and blue image data. The input lens data may include voltages provided to the lens electrodes to represent refractivity of the liquid crystal lens 300. The input control signal may include a master clock signal, a vertical synchronizing signal, an inverting signal and so on.

The controller 400 may identify a driving mode, which includes the 2D mode and the 3D mode, based on the input image data. Alternatively, the controller 400 may receive an indication of the driving mode from an outside source.

The controller 400 includes the light source controller, the panel controller and the lens controller. The light source controller, the panel controller and the lens controller may either be physically divided or logically divided.

The light source controller generates a light source control signal. The light source controller outputs the light source control signal to the light source driver 500. The light source controller may generate light source control signals which vary according to the driving mode.

The panel controller generates a panel control signal and a panel data signal based on the driving mode, the input control signal and the input image data. The panel controller outputs the panel control signal and the panel data signal to the panel driver 600.

The panel control signal may include a first control signal for controlling a driving timing of a gate driver of the panel driver 600 and a second control signal for controlling a driving timing of a data driver of the panel driver 600.

The lens controller generates a lens control signal and a lens data signal based on the driving mode, the input control signal and the input lens data. The lens controller outputs the lens control signal and the lens data signal to the lens driver 700.

The light source driver 500 receives the light source control signal. The light source driver 500 generates a light source driving voltage for driving the light source. The light source driver 500 outputs the light source driving voltage to the light source part 100.

The light source driver 500 may be disposed under the light source part 100. The light source driver 500 may be disposed out of a receiving container (not shown) facing a bottom surface of the light source part 100.

The panel driver 600 includes the gate driver and the data driver.

The gate driver receives the first control signal from the panel controller. The gate driver generates gate signals for driving the gate lines of the display panel 200 in response to the first control signal. The gate driver sequentially outputs the gate signals to the gate lines of the display panel 200.

The gate driver may include a gate printed circuit board ("PCB") 610 and a gate driving chip 620. The gate PCB 610 is connected to the controller 400. The gate PCB 610 may be connected to the controller 400 through a cable or a wire. The gate driving chip 620 may be disposed on a tape carrier package ("TCP") connecting the gate PCB 610 to the first panel substrate 210 of the display panel 200.

Alternatively, the gate driver may be directly mounted on the display panel 200. The gate driver may be integrated on the display panel 200.

The data driver receives the panel data signal and the second control signal from the panel controller. The data driver converts the data signal into analogue data voltages in response to the second control signal. The data driver sequentially outputs the data voltages to the data lines of the display panel 200.

The data driver may include a data PCB 630 and a data driving chip 640. The data PCB 630 is connected to the controller 400. The data PCB 630 may be connected to the controller 400 through a cable or a wire. The data driving chip 640 may be disposed on a TCP connecting the data PCB 630 to the first panel substrate 210 of the display panel 200.

Alternatively, the data driver may be directly mounted on the display panel 200. The data driver may be integrated on the display panel 200.

The lens driver 700 receives the lens data signal and the lens control signal from the lens controller. The lens driver 700 converts the lens data signal to analogue lens voltages in response to the lens control signal. The lens driver 700 sequentially outputs the lens voltages to the lens electrodes of the liquid crystal lens 300.

The lens driver 700 includes a first lens driver disposed adjacent to a first side of the liquid crystal lens 300 and a second lens driver disposed adjacent to a second side of the liquid crystal lens 300 facing the first side.

The first lens driver may include a first lens PCB 710 and a first lens driving chip 720. The first lens PCB 710 is connected to the controller 400. The first lens PCB 710 may be connected to the controller 400 through a cable or a wire. The first lens driving chip 720 may be disposed on a TCP connecting the first lens PCB 710 to the first lens substrate 310 of the liquid crystal lens 300.

The second lens driver may include a second lens PCB 730 and a second lens driving chip 740. The second lens PCB 730 is connected to the controller 400. The second lens PCB 730 may be connected to the controller 400 through a cable or a wire. The second lens driving chip 740 may be disposed on a TCP connecting the second lens PCB 720 to the first lens substrate 310 of the liquid crystal lens 300.

Alternatively, the first and second lens drivers may be directly mounted on the liquid crystal lens 300. The first and second lens drivers may be integrated on the liquid crystal lens 300.

The substrate 800 is disposed between the display panel 200 and the liquid crystal lens 300. The substrate 800 separates the display panel 200 and the liquid crystal lens 300. The substrate 800 may include a glass.

A lower surface of the substrate 800 may be bonded to an upper surface of the display panel 200. An upper surface of the substrate 800 may be bonded to a lower surface of the liquid crystal lens 300.

Alternatively, the substrate 800 may be formed integratedly with the second panel substrate 220 of the display panel 200. Alternatively, the substrate 800 may be formed integratedly with the first lens substrate 310 of the liquid crystal lens 300.

Figure 3:
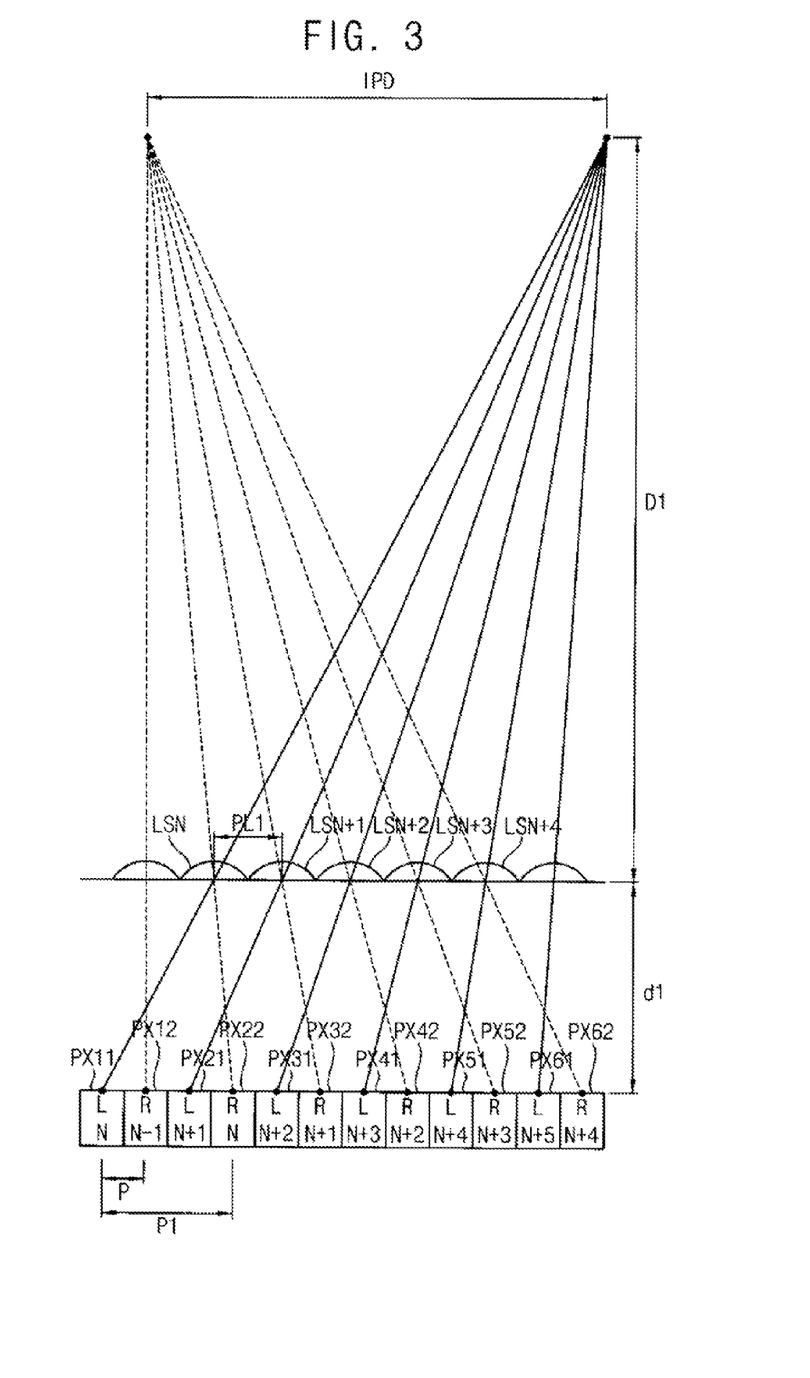
FIG. 3 is a conceptual diagram illustrating a method of displaying a three-dimensional ("3D") image by the display apparatus of FIG. 1.

FIG. 3 is a conceptual diagram illustrating a method of displaying the 3D image by the display apparatus of FIG. 1.

Referring to FIGS. 1 to 3, the display panel 200 includes a plurality of pixel groups. For example, the display panel 200 includes a first pixel group, a second pixel group, a third pixel group, a fourth pixel group, a fifth pixel group and a sixth pixel group.

Each pixel group includes two pixels adjacent to each other. A first pixel in the pixel group displays a left image viewed by a left eye of an observer. A second pixel in the pixel group displays a right image viewed by a right eye of the observer.

For example, the first pixel group includes a first pixel PX11 and a second pixel PX12. The second pixel group includes a third pixel PX21 and a fourth pixel PX22. The third pixel group includes a fifth pixel PX31 and a sixth pixel PX32. The fourth pixel group includes a seventh pixel PX41 and an eighth pixel PX42. The fifth pixel group includes a ninth pixel PX51 and a tenth pixel PX52. The sixth pixel group includes an eleventh pixel PX61 and a twelfth pixel PX62.

The first, third, fifth, seventh, ninth and eleventh pixels PX11, PX21, PX31, PX41, PX51 and PX61 display left images. The second, fourth, sixth, eighth, tenth and twelfth pixels PX12, PX22, PX32, PX42, PX52 and PX62 display right images.

The first pixel PX11 in the first pixel group displays an N-th left image LN. The second pixel PX12 in the first pixel group displays an (N−1)-th right image RN−1. The third pixel PX21 in the second pixel group displays an (N+1)-th left image LN+1. The fourth pixel PX22 in the second pixel group displays an N-th right image RN. The fifth pixel PX31 in the third pixel group displays an (N+2)-th left image LN+2. The sixth pixel PX32 in the third pixel group displays an (N+1)-th right image RN+1. The seventh pixel PX41 in the fourth pixel group displays an (N+3)-th left image LN+3. The eighth pixel PX42 in the fourth pixel group displays an (N+2)-th right image RN+2. The ninth pixel PX51 in the fifth pixel group displays an (N+4)-th left image LN+4. The tenth pixel PX52 in the fifth pixel group displays an (N+3)-th right image RN+3. The eleventh pixel PX61 in the sixth pixel group displays an (N+5)-th left image LN+5. The twelfth pixel PX62 in the sixth pixel group displays an (N+4)-th right image RN+4. Here, N is a positive integer.

According to an exemplary embodiment, although the display panel 200 includes twelve pixels PX11 to PX62 for convenience of explanation, the number of the pixels included in the display panel 200 is not limited thereto.

Each pixel may include a plurality of subpixels. Each pixel may include a red subpixel, a green subpixel and a blue subpixel. For example, each pixel may include a single red subpixel, a single green subpixel and a single blue subpixel. Alternatively, each pixel may include a plurality of red subpixels, a plurality of green subpixels and a plurality of blue subpixels. One or more subpixels may also be shared between adjacent pixels.

The N-th left image LN represents a divided image corresponding to an N-th position in an entire left image. The N-th right image RN represents a divided image corresponding to the N-th position in an entire right image. Thus, the N-th left image LN and the N-th right image RN have a corresponding position in the display panel 200.

A pixel cycle P is defined as a distance between two pixels adjacent to each other in the first direction DR1. A corresponding pixel cycle P1 is defined as a distance between two pixels, which respectively display left and right images in the corresponding position, in the first direction DR1.

The corresponding pixel cycle P1 is greater than the pixel cycle P. Thus, a pixel displaying the N-th left image LN is spaced apart from a pixel displaying the N-th right image RN. In addition, the pixel displaying the N-th left image LN is disposed in a pixel group different from a pixel group in which the pixel displaying the N-th right image RN is disposed.

The corresponding pixel cycle P1 may be (2K+1) times greater than the pixel cycle P. Here, K is a positive integer. The corresponding pixel cycle P1, which is a distance between the first pixel PX11 displaying the N-th left image LN and the fourth pixel PX22 displaying the N-th right image, may be, for example, three times greater than the pixel cycle P. The first pixel PX11 displaying the N-th left image LN is spaced apart from the fourth pixel PX22 displaying the N-th right image RN by three pixel cycles 3P. The first pixel PX11 displaying the N-th left image LN is disposed in the first pixel group and the fourth pixel PX22 displaying the N-th right image RN is disposed in the second pixel group.

The substrate 800 is disposed between the display panel 200 and the liquid crystal lens 300. The liquid crystal lens 300 is spaced apart from the display panel 200 by a thickness of the substrate 800.

The liquid crystal lens 300 includes a plurality of unit lenses. The liquid crystal lens 300 includes an N-th unit lens LSN, an (N+1)-th unit lens LSN+1, an (N+2)-th unit lens LSN+2, an (N+3)-th unit lens LSN+3 and an (N+4)-th unit lens LSN+4.

The N-th unit lens LSN transmits the N-th left image LN to a left eye of an observer and the N-th right image RN to a right eye of the observer. The (N+1)-th unit lens LSN+1 transmits the (N+1)-th left image LN+1 to the left eye of the observer and the (N+1)-th right image RN+1 to the right eye of the observer. The (N+2)-th unit lens LSN+2 transmits the (N+2)-th left image LN+2 to the left eye of the observer and the (N+2)-th right image RN+2 to the right eye of the observer. The (N+3)-th unit lens LSN+3 transmits the (N+3)-th left image LN+3 to the left eye of the observer and the (N+3)-th right image RN+3 to the right eye of the observer. The (N+4)-th unit lens LSN+4 transmits the (N+4)-th left image LN+4 to the left eye of the observer and the (N+4)-th right image RN+4 to the right eye of the observer.

A magnification M1 of the unit lens may be determined in accordance with Equation 1.

$$M1 = \frac{IPD}{P1} = \frac{IPD}{3P} \quad \text{[Equation 1]}$$

Herein, IPD is a distance between the left eye and the right eye of the observer.

According to exemplary embodiments, the corresponding pixel cycle P1 is determined as three times of the pixel cycle P so that the magnification M1 of the unit lens is ⅓ of a magnification of a unit lens applied to a display panel having a corresponding pixel cycle equal to a single pixel cycle.

IPD may statistically be between about 41 mm and about 70 mm. An average of IPD may be about 63 mm and about 65 mm.

According to a range of IPD, a tolerance of the magnification M1 of the unit lens may be determined. The tolerance of the magnification M1 of the unit lens may be determined in accordance with an overlap of viewpoint. For example, the tolerance of the corresponding pixel cycle P1 may be determined as a range between (3−⅔) times of the pixel cycle P and (3+⅔) times of the pixel cycle P.

The magnification M1 of the unit lens having the tolerance is determined in accordance with the tolerance of the corresponding pixel cycle P1 in accordance with Equation 2.

$$\frac{IPD}{\left(3+\frac{2}{3}\right)P} \leq M1 \leq \frac{IPD}{\left(3-\frac{2}{3}\right)P} \quad \text{[Equation 2]}$$

A focal length f1 of the unit lens is determined in accordance with Equation 3.

$$f1 = \frac{D1}{M1+1} \quad \text{[Equation 3]}$$

Herein, D1 is a distance from the eyes of the observer to the liquid crystal lens 300. As shown in Equation 3, the focal length f1 of the unit lens is proportional to $$\frac{D1}{M1+1}.$$

The focal length f1 of the unit lens may be properly adjusted according to desired tolerance. For example, the tolerance of the focal length f1 may be about 20%.

The focal length f1 of the unit lens having the tolerance is determined in accordance with Equation 4.

$$0.8\frac{D1}{M1+1} \leq f1 \leq 1.2\frac{D1}{M1+1} \quad \text{[Equation 4]}$$

A lens cycle PL1 of the unit lens is defined as a distance between two unit lenses adjacent to each other in the first direction DR1. The lens cycle PL1 of the unit lens according to an exemplary embodiment is determined in accordance with Equation 5.

$$PL1 = 2P\frac{M1}{M1+1} \quad \text{[Equation 5]}$$

The lens cycle PL1 of the unit lens may be properly adjusted according to a desired tolerance. When the thickness of the substrate 800 has a constant value throughout the substrate, the lens cycle PL1 of the unit lens is related to the distance D1 from the eyes of the observer to the liquid crystal lens 300. For example, the distance D1 may have a tolerance between about 50% and 150%.

The lens cycle PL1 of the unit lens having the tolerance is determined in accordance with Equation 6.

$$2P\frac{M1}{M1+2} \le PL1 \le 2P\frac{3M1}{3M1+2} \quad \text{[Equation 6]}$$

The thickness d1 of the substrate 800 is determined in accordance with Equation 7.

$$d1 = Nm\frac{D1}{M1} \quad \text{[Equation 7]}$$

Herein, Nm represents a refractive index of the substrate 800. As shown in FIG. 7, the thickness d1 of the substrate 800 is proportional to $$Nm\frac{D1}{M1}.$$

The thickness d1 of the substrate 800 may be properly adjusted according to a desired tolerance in accordance with a processing margin. For example, the tolerance of the thickness d1 of the substrate 800 may be about 8%.

The thickness d1 of the substrate 800 having the tolerance is determined in accordance with Equation 8.

$$0.92Nm\frac{D1}{M1} \le d1 \le 1.08Nm\frac{D1}{M1} \quad \text{[Equation 8]}$$

According to an exemplary embodiment, although the display apparatus includes the liquid crystal lens 300, the present invention is not limited thereto. The display apparatus may include a lenticular lens. Alternatively, the display apparatus may include a fixed parallax barrier. Alternatively, the display apparatus may include a liquid crystal parallax barrier.

According to an exemplary embodiment, the unit lens has a relatively low magnification M1 so that the unit lens may diffract the image on the display panel 200 in a relatively small angle to display the 3D image. In addition, when the unit lens is a Fresnel lens, a unit area of the Fresnel lens may increase so that the number of lens electrodes may decrease in the unit area. Thus, a refracting efficiency of the unit lens may be increased. Crosstalk between the left and right eye images may accordingly be minimized or prevented. Therefore, a display quality of the 3D image may be increased.

Figure 4:
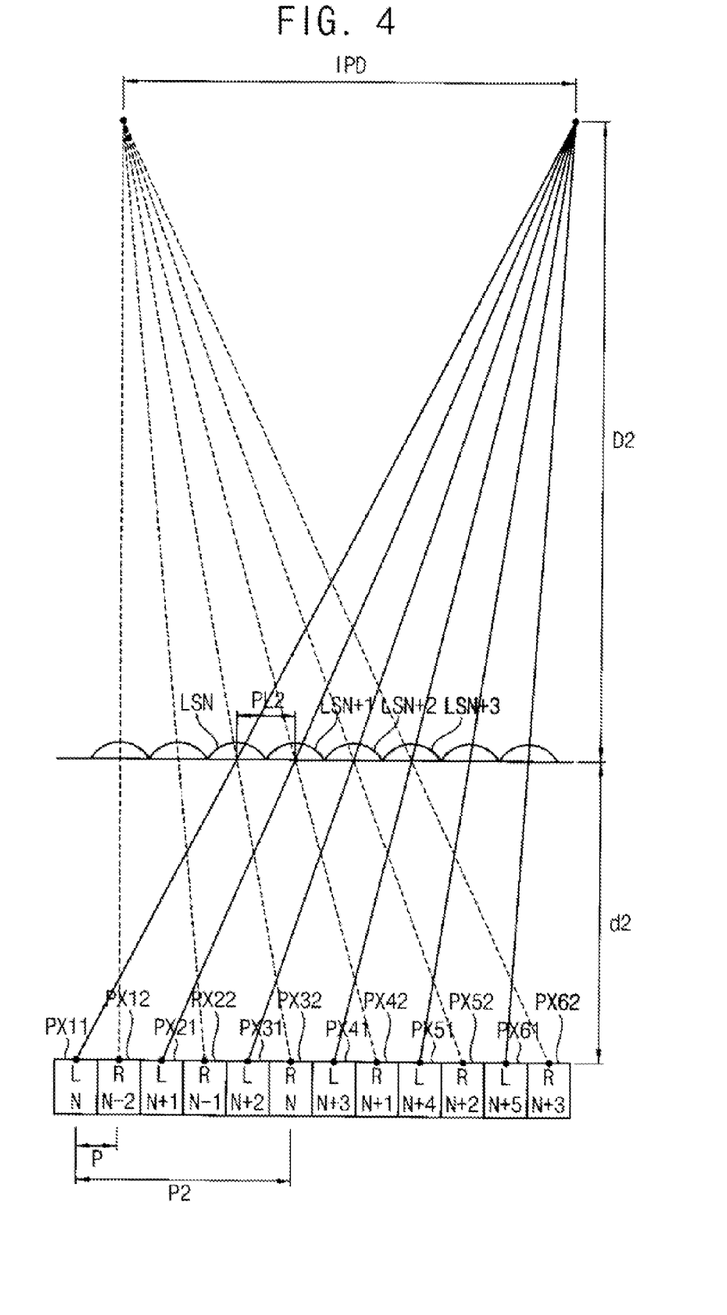
FIG. 4 is a conceptual diagram illustrating a method of displaying a 3D image by a display apparatus according to an exemplary embodiment.

FIG. 4 is a conceptual diagram illustrating a method of displaying a 3D image by a display apparatus according to an exemplary embodiment of the present invention.

A display apparatus and a method of displaying the 3D image as shown in FIG. 3 may be substantially the same as the display apparatus and the method of displaying the 3D image explained above with reference to FIGS. 1 to 3 except for a pixel structure of the display panel 200, a magnification of the unit lens of the liquid crystal lens 300 and a thickness of the substrate 800. Thus, the same reference numerals may be used to refer to the same or like parts as those described above and any repetitive explanation concerning the above elements may be omitted.

Referring to FIGS. 1, 2 and 4, the display apparatus includes a light source part 100, a display panel 200, a liquid crystal lens 300, a controller 400, a light source driver 500, a panel driver 600, a lens driver 700 and a substrate 800.

The display panel 200 includes a plurality of pixel groups. For example, the display panel 200 includes a first pixel group, a second pixel group, a third pixel group, a fourth pixel group, a fifth pixel group and a sixth pixel group.

A first pixel PX11 in the first pixel group displays an N-th left image LN. A second pixel PX12 in the first pixel group displays an (N−2)-th right image RN−2. A third pixel PX21 in the second pixel group displays an (N+1)-th left image LN+1. A fourth pixel PX22 in the second pixel group displays an (N−1)-th right image RN−1. A fifth pixel PX31 in the third pixel group displays an (N+2)-th left image LN+2. A sixth pixel PX32 in the third pixel group displays an N-th right image RN. A seventh pixel PX41 in the fourth pixel group displays an (N+3)-th left image LN+3. An eighth pixel PX42 in the fourth pixel group displays an (N+1)-th right image RN+1. A ninth pixel PX51 in the fifth pixel group displays an (N+4)-th left image LN+4. A tenth pixel PX52 in the fifth pixel group displays an (N+2)-th right image RN+2. An eleventh pixel PX61 in the sixth pixel group displays an (N+5)-th left image LN+5. A twelfth pixel PX62 in the sixth pixel group displays an (N+3)-th right image RN+3. Here, N is a positive integer.

A corresponding pixel cycle P2 may be (2K+1) times greater than a pixel cycle P. Here, K is a positive integer. According to an exemplary embodiment, the corresponding pixel cycle P2, which is a distance between the first pixel PX11 displaying the N-th left image LN and the sixth pixel PX32 displaying the N-th right image, is five times greater than the pixel cycle P. The first pixel PX11 displaying the N-th left image LN is spaced apart from the sixth pixel PX32 displaying the N-th right image RN by five pixel cycles 5P. The first pixel PX11 displaying the N-th left image LN is disposed in the first pixel group and the sixth pixel PX32 displaying the N-th right image RN is disposed in the third pixel group.

The substrate 800 is disposed between the display panel 200 and the liquid crystal lens 300. The liquid crystal lens 300 is spaced apart from the display panel 200 by a thickness of the substrate 800.

The liquid crystal lens 300 includes a plurality of unit lenses. The liquid crystal lens 300 includes an N-th unit lens LSN, an (N+1)-th unit lens LSN+1, an (N+2)-th unit lens LSN+2 and an (N+3)-th unit lens LSN+3.

The N-th unit lens LSN transmits the N-th left image LN to a left eye of an observer and the N-th right image RN to a right eye of the observer. The (N+1)-th unit lens LSN+1 transmits the (N+1)-th left image LN+1 to the left eye of the observer and the (N+1)-th right image RN+1 to the right eye of the observer. The (N+2)-th unit lens LSN+2 transmits the (N+2)-th left image LN+2 to the left eye of the observer and the (N+2)-th right image RN+2 to the right eye of the observer. The (N+3)-th unit lens LSN+3 transmits the (N+3)-th left image LN+3 to the left eye of the observer and the (N+3)-th right image RN+3 to the right eye of the observer.

A magnification M2 of the unit lens is determined in accordance with Equation 9.

$$M2 = \frac{IPD}{P2} = \frac{IPD}{5P} \quad \text{[Equation 9]}$$

Herein, IPD is a distance between the left eye and the right eye of the observer.

According to exemplary embodiments of the present invention, where the corresponding pixel cycle P2 is determined as five times of the pixel cycle P, the magnification M2 of the unit lens is ⅕ of a magnification of a unit lens applied to a display panel having a corresponding pixel cycle equal to a single pixel cycle.

IPD may statistically be between about 41 mm and about 70 mm. An average of IPD may be about 63 mm and about 65 mm.

According to a range of IPD, a tolerance of the magnification M2 of the unit lens may be determined. The tolerance of the magnification M2 of the unit lens may be determined in accordance with an overlap of viewpoint. For example, the tolerance of the corresponding pixel cycle P2 may be determined as a range between (5−⅔) times of the pixel cycle P and (5+⅔) times of the pixel cycle P.

The magnification M2 of the unit lens having a predetermined tolerance is determined in accordance with the tolerance of the corresponding pixel cycle P2 in accordance with Equation 10.

$$\frac{IPD}{\left(5+\frac{2}{3}\right)P} \le M2 \le \frac{IPD}{\left(5-\frac{2}{3}\right)P} \qquad \text{[Equation 10]}$$

A focal length f2 of the unit lens is determined in accordance with Equation 11.

$$f2 = \frac{D2}{M2+1} \qquad \text{[Equation 11]}$$

Herein, D2 is a distance from the eyes of the observer to the liquid crystal lens 300. As shown in Equation 11, the focal length f2 of the unit lens is proportional to $$\frac{D2}{M2+1}.$$

The focal length f2 of the unit lens may be properly adjusted within a desired tolerance according to an exemplary embodiment. For example, the tolerance of the focal length f2 may be about 20%.

The focal length f2 of the unit lens having the tolerance is determined in accordance with Equation 12.

$$0.8\frac{D2}{M2+1} \le f2 \le 1.2\frac{D2}{M2+1} \qquad \text{[Equation 12]}$$

A lens cycle PL2 of the unit lens is defined as a distance between two unit lenses adjacent to each other. The lens cycle PL2 of the unit lens according to exemplary embodiments is determined in accordance with Equation 13.

$$PL2 = 2P\frac{M2}{M2+1} \qquad \text{[Equation 13]}$$

The lens cycle PL2 of the unit lens may be properly adjusted within a desired tolerance according to an exemplary embodiment. When the thickness of the substrate 800 has a constant value throughout the substrate, the lens cycle PL2 of the unit lens is related to the distance D2 from the eyes of the observer to the liquid crystal lens 300. For example, the distance D2 may have a tolerance of between about 50% and 150%.

The lens cycle PL2 of the unit lens having the desired tolerance is determined in accordance with Equation 14.

$$2P\frac{M2}{M2+2} \le PL2 \le 2P\frac{3M2}{3M2+2} \qquad \text{[Equation 14]}$$

The thickness d2 of the substrate 800 is determined in accordance with Equation 15.

$$d2 = Nm\frac{D2}{M2}. \qquad \text{[Equation 15]}$$

Herein, Nm represents a refractive index of the substrate 800. As shown in FIG. 15, the thickness d2 of the substrate 800 is proportional to $$Nm\frac{D2}{M2}.$$

The thickness d2 of the substrate 800 may be properly adjusted in a desired tolerance in accordance with a processing margin. For example, the tolerance of the thickness d2 of the substrate 800 may be about 8%.

The thickness d2 of the substrate 800 having the tolerance is determined in accordance with Equation 16.

$$0.92Nm\frac{D2}{M2} \le d2 \le 1.08Nm\frac{D2}{M2} \qquad \text{[Equation 16]}$$

According to exemplary embodiments of the present invention, the unit lens has a relatively low magnification M2 so that the unit lens may diffract the image on the display panel 200 in a relatively small angle to display the 3D image. In addition, when the unit lens is a Fresnel lens, a unit area of the Fresnel lens may increase so that the number of lens electrodes may decrease in the unit area. Thus, a refracting efficiency of the unit lens may be increased. Accordingly, crosstalk between the left and right images may be reduced or prevented. Therefore, a display quality of the 3D image may be increased.

Figure 5:
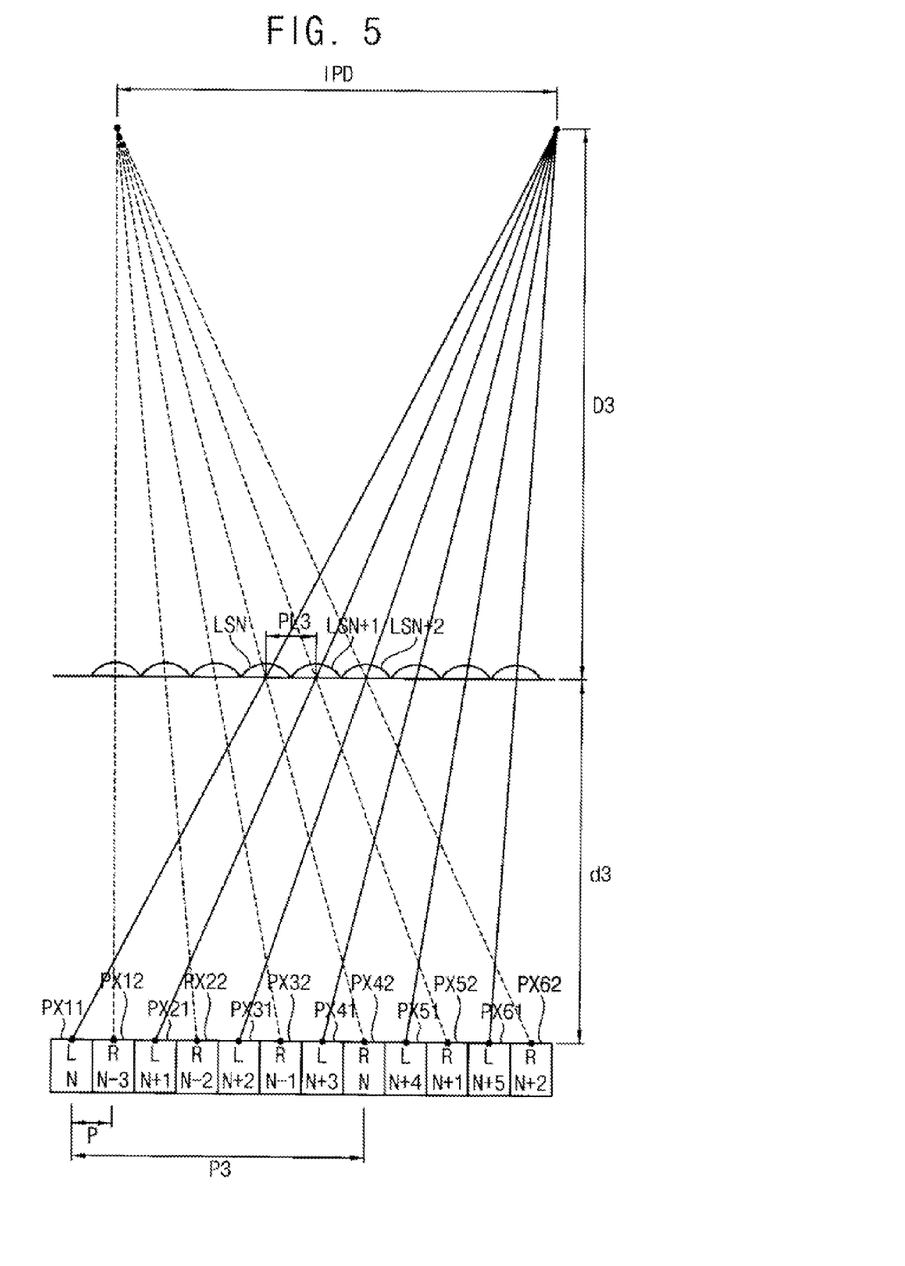
FIG. 5 is a conceptual diagram illustrating a method of displaying a 3D image by a display apparatus according to an exemplary embodiment.

FIG. 5 is a conceptual diagram illustrating a method of displaying a 3D image by a display apparatus according to an exemplary embodiment.

A display apparatus and a method of displaying the 3D image according to an exemplary embodiment of the preset invention discussed below may be substantially the same as the display apparatus and the method of displaying the 3D image discussed above with reference to FIGS. 1 to 3 except for a pixel structure of the display panel 200, a magnification of the unit lens of the liquid may be used to refer to the same or like parts as those described above with reference to FIGS. 1 to 3 and any repetitive explanation concerning the above elements may be omitted.

Referring to FIGS. 1, 2 and 5, the display apparatus includes a light source part 100, a display panel 200, a liquid crystal lens 300, a controller 400, a light source driver 500, a panel driver 600, a lens driver 700 and a substrate 800.

The display panel 200 includes a plurality of pixel groups. For example, the display panel 200 includes a first pixel group, a second pixel group, a third pixel group, a fourth pixel group, a fifth pixel group and a sixth pixel group.

A first pixel PX11 in the first pixel group displays an N-th left image LN. A second pixel PX12 in the first pixel group displays an (N−3)-th right image RN−3. A third pixel PX21 in the second pixel group displays an (N+1)-th left image LN+1. A fourth pixel PX22 in the second pixel group displays an (N−2)-th right image RN−2. A fifth pixel PX31 in the third pixel group displays an (N+2)-th left image LN+2. A sixth pixel PX32 in the third pixel group displays an (N−1)-th right image RN−1. A seventh pixel PX41 in the fourth pixel group displays an (N+3)-th left image LN+3. An eighth pixel PX42 in the fourth pixel group displays an N-th right image RN. A ninth pixel PX51 in the fifth pixel group displays an (N+4)-th left image LN+4. A tenth pixel PX52 in the fifth pixel group displays an (N+1)-th right image RN+1. An eleventh pixel PX61 in the sixth pixel group displays an (N+5)-th left image LN+5. A twelfth pixel PX62 in the sixth pixel group displays an (N+2)-th right image RN+2. Here, N is a positive integer.

A corresponding pixel cycle P3 may be (2K+1) times greater than a pixel cycle P. Here, K is a positive integer. According to exemplary embodiments, the corresponding pixel cycle P3, which is a distance between the first pixel PX11 displaying the N-th left image LN and the eighth pixel PX42 displaying the N-th right image, is seven times greater than the pixel cycle P. The first pixel PX11 displaying the N-th left image LN is spaced apart from the eighth pixel PX42 displaying the N-th right image RN by seven pixel cycles 7P. The first pixel PX11 displaying the N-th left image LN is disposed in the first pixel group and the eighth pixel PX32 displaying the N-th right image RN is disposed in the fourth pixel group.

The substrate 800 is disposed between the display panel 200 and the liquid crystal lens 300. The liquid crystal lens 300 is spaced apart from the display panel 200 by a thickness of the substrate 800.

The liquid crystal lens 300 includes a plurality of unit lenses. The liquid crystal lens 300 includes an N-th unit lens LSN, an (N+1)-th unit lens LSN+1 and an (N+2)-th unit lens LSN+2.

The N-th unit lens LSN transmits the N-th left image LN to a left eye of an observer and the N-th right image RN to a right eye of the observer. The (N+1)-th unit lens LSN+1 transmits the (N+1)-th left image LN+1 to the left eye of the observer and the (N+1)-th right image RN+1 to the right eye of the observer. The (N+2)-th unit lens LSN+2 transmits the (N+2)-th left image LN+2 to the left eye of the observer and the (N+2)-th right image RN+2 to the right eye of the observer.

A magnification M3 of the unit lens is determined in accordance with Equation 17.

$$M3 = \frac{IPD}{P3} = \frac{IPD}{7P} \quad \text{[Equation 17]}$$

Here, IPD is a distance between the left eye and the right eye of the observer.

The corresponding pixel cycle P3 may here be determined as seven times of the pixel cycle P so that the magnification M3 of the unit lens is 1/7 of a magnification of a unit lens applied to a display panel having a corresponding pixel cycle equal to a single pixel cycle.

MD may statistically be between about 41 mm and about 70 mm. An average of IPD may be about 63 mm and about 65 mm.

According to a range of IPD, a tolerance of the magnification M3 of the unit lens may be determined. The tolerance of the magnification M3 of the unit lens may be determined in accordance with an overlap of viewpoint. For example, the tolerance of the corresponding pixel cycle P3 may be determined as a range between (7−⅔) times of the pixel cycle P and (7+⅔) times of the pixel cycle P.

The magnification M3 of the unit lens having the tolerance is determined in accordance with the tolerance of the corresponding pixel cycle P3 in accordance with Equation 18.

$$\frac{IPD}{\left(7+\frac{2}{3}\right)P} \leq M3 \leq \frac{IPD}{\left(7-\frac{2}{3}\right)P} \quad \text{[Equation 18]}$$

A focal length f3 of the unit lens is determined in accordance with Equation 19.

$$f3 = \frac{D3}{M3+1} \quad \text{[Equation 19]}$$

Herein, D3 is a distance from the eyes of the observer to the liquid crystal lens 300. As shown in Equation 19, the focal length f3 of the unit lens is proportional to $$\frac{D3}{M3+1}.$$

The focal length f3 of the unit lens may be properly adjusted to a desired tolerance. For example, the tolerance of the focal length f3 may be about 20%.

The focal length f3 of the unit lens having the desired tolerance is determined in accordance with Equation 20.

$$0.8\frac{D3}{M3+1} \leq f3 \leq 1.2\frac{D3}{M3+1} \quad \text{[Equation 20]}$$

A lens cycle PL3 of the unit lens is defined as a distance between two unit lenses adjacent to each other. The lens cycle PL3 of the unit lens may be determined in accordance with Equation 21.

$$PL3 = 2P\frac{M3}{M3+1} \quad \text{[Equation 21]}$$

The lens cycle PL3 of the unit lens may be properly adjusted according to a desired tolerance. When the thickness of the substrate 800 has a constant value throughout the substrate, the lens cycle PL3 of the unit lens is related to the distance D3 from the eyes of the observer to the liquid crystal lens 300. For example, the distance D3 may have a tolerance between about 50% and 150%.

The lens cycle PL3 of the unit lens having the desired tolerance is determined in accordance with Equation 22.

$$2P\frac{M3}{M3+2} \leq PL3 \leq 2P\frac{3M3}{3M3+2} \quad \text{[Equation 22]}$$

The thickness d3 of the substrate 800 is determined in accordance with Equation 23.

$$d3 = Nm\frac{D3}{M3} \qquad \text{[Equation 23]}$$

Herein, Nm represents a refractive index of the substrate 800. As shown in FIG. 23, the thickness d3 of the substrate 800 is proportional to $$Nm\frac{D3}{M3}.$$

The thickness d3 of the substrate 800 may be properly adjusted within a desired tolerance in accordance with a processing margin. For example, the tolerance of the thickness d3 of the substrate 800 may be about 8%.

The thickness d3 of the substrate 800 having the tolerance is determined in accordance with Equation 24.

$$0.92 Nm\frac{D3}{M3} \le d3 \le 1.08 Nm\frac{D3}{M3} \qquad \text{[Equation 24]}$$

According to an exemplary embodiment, the unit lens has a relatively low magnification M3 so that the unit lens may diffract the image on the display panel 200 in a relatively small angle to display the 3D image. In addition, when the unit lens is a Fresnel lens, a unit area of the Fresnel lens may increase so that the number of lens electrodes may decrease in the unit area. Thus, a refracting efficiency of the unit lens may be increased. Accordingly, crosstalk between the left and right eye images may be reduced or prevented. Therefore, a display quality of the 3D image may be increased.

Figure 6:
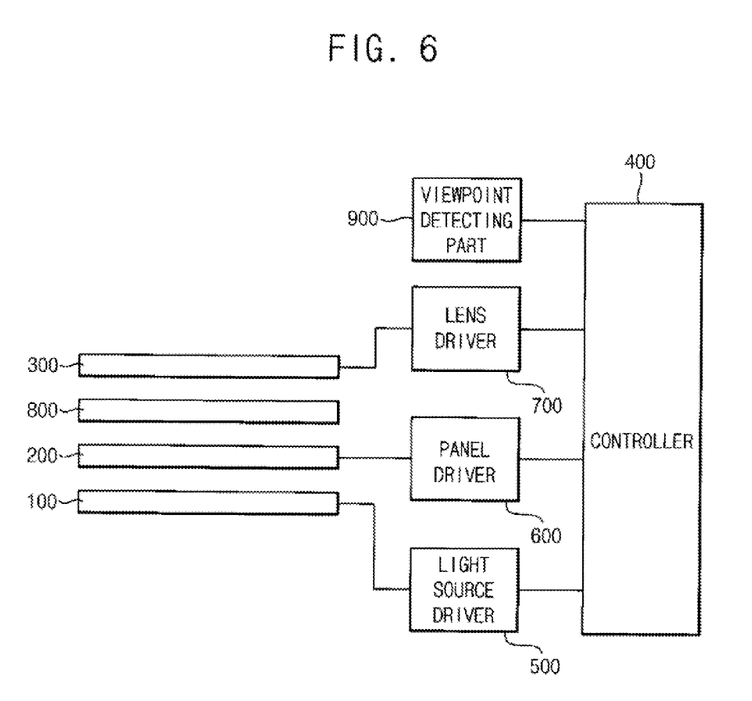
FIG. 6 is a block diagram illustrating a display apparatus according to an exemplary embodiment.

FIG. 6 is a block diagram illustrating a display apparatus according to an exemplary embodiment of the present invention.

A display apparatus and a method of displaying the 3D image according to an exemplary embodiment are substantially the same as the display apparatus and the method of displaying the 3D image discussed above with respect to FIGS. 1 to 3 except that the display apparatus further includes a viewpoint detecting part. Thus, the same reference numerals may be used to refer to the same or like parts as those described above with respect to FIGS. 1 to 3 and any repetitive explanation concerning the above elements may be omitted.

Referring to FIG. 6, the display apparatus includes the light source part 100, the display panel 200, the liquid crystal lens 300, a controller 400, the light source driver 500, the panel driver 600, the lens driver 700, a substrate 800 and a viewpoint detecting part 900.

The viewpoint detecting part 900 detects a viewpoint of an observer. The viewpoint detecting part 900 outputs viewpoint data of the observer to the controller 400.

The viewpoint detecting part 900 may include a camera. The viewpoint detecting part 900 may be disposed on a bezel of a receiving container of the display panel 200.

The controller 400 adjusts a panel control signal and a panel data signal based on the viewpoint data from the viewpoint detecting part 900. The controller 400 outputs the adjusted panel control signal and the adjusted panel data signal to the panel driver 600. Thus, a left image and a right image displayed on the display panel 200 are adjusted by the viewpoint detecting part 900.

Each pixel of the display panel 200 may include a plurality of subpixels. In the present exemplary embodiment, each pixel may include a plurality of red subpixels, a plurality of green subpixels and a plurality of blue subpixels for smooth image conversion according to a displacement of the viewpoint of the observer. For example, each pixel may include two red subpixels, two green subpixels and two blue subpixels.

According to an exemplary embodiment, the unit lens has a relatively low magnification M1 so that the unit lens may diffract the image on the display panel 200 in a relatively small angle to display the 3D image. In addition, when the unit lens is a Fresnel lens, a unit area of the Fresnel lens may increase so that the number of lens electrodes may decrease in the unit area. Thus, a refracting efficiency of the unit lens may be increased. Accordingly, crosstalk between the left and right eye images may be reduced or prevented. In addition, the display apparatus further includes the viewpoint detecting part 900 for detecting the position and orientation of the observer, and in particular, the eyes of the observer, so that the 3D image is smoothly displayed although the viewpoint of the observer may change. Therefore, a display quality of the 3D image may be increased.

As explained above, according to the display apparatus and the method of displaying the 3D image of exemplary embodiments of the present invention, crosstalk between the left and right eye images is reduced or prevented so that a display quality of the 3D image may be increased.

The foregoing is illustrative of the present invention and is not to be construed as limiting thereof. Although a few exemplary embodiments of the present invention have been described, those skilled in the art will readily appreciate that many modifications are possible according to an exemplary embodiments without materially departing from the teachings and aspects of the present invention.

What is claimed is:

1. A display apparatus comprising:
a display panel including a first pixel displaying an N-th portion of a left image corresponding to an N-th position in the left image and a second pixel displaying an N-th portion of a right image corresponding to the N-th position in the right image, the second pixel being spaced apart from the first pixel with one or more additional left image pixels and one or more additional right image pixels disposed between the second and first pixels; and
a liquid crystal lens including a unit lens directing the N-th left image to a left eye of an observer and the N-th right image to a right eye of the observer,
wherein N is a positive integer.

2. The display apparatus of claim 1, wherein a pixel cycle is a distance between pixels adjacent to each other in a first direction,
the second pixel is spaced apart from the first pixel by 2K+1 pixel cycles, and
K is a positive integer.

3. A display apparatus comprising:
a display panel including a first pixel displaying an N-th portion of a left image corresponding to an N-th position in the left image and a second pixel displaying an N-th portion of a right image corresponding to the N-th position in the right image, the second pixel being spaced apart from the first pixel with one or more additional pixels disposed between the second and first pixels; and
a liquid crystal lens including a unit lens directing the N-th left image to a left eye of an observer and the N-th right image to a right eye of the observer, wherein N is a positive integer,
wherein a pixel cycle is a distance between pixels adjacent to each other in a first direction,
wherein the second pixel is spaced apart from the first pixel by 2K+1 pixel cycles,
wherein K is a positive integer,
wherein a range of a magnification M of the unit lens is:

$$\frac{IPD}{(2K+1+X)P} \le M \le \frac{IPD}{(2K+1-X)P},$$

and
wherein IPD is a distance between the left eye and the right eye of the observer,
P is the pixel cycle, and
X is a tolerance constant of the pixel cycle.

4. The display apparatus of claim 3, wherein the magnification M of the unit lens is $$M = \frac{IPD}{(2K+1)P}.$$

5. The display apparatus of claim 3, wherein a focal length f of the unit lens is proportional to $$\frac{D}{M+1},$$

and
D is a distance from the left and right eyes of the observer to the liquid crystal lens.

6. The display apparatus of claim 3, wherein a lens cycle is a distance between the unit lenses adjacent to each other in the first direction, and
a range of the lens cycle PL is $$2P\frac{M}{M+2} \le PL \le 2P\frac{3M}{3M+2}.$$

7. The display apparatus of claim 6, wherein the lens cycle PL is $$PL = 2P\frac{M}{M+1}.$$

8. The display apparatus of claim 3, further comprising a substrate disposed between the display panel and the liquid crystal lens,
wherein a thickness d of the substrate is proportional to $$Nm\frac{D}{M},$$

and
Nm is a refractive index of the substrate.

9. The display apparatus of claim 1, wherein the display panel further comprises a third pixel adjacent to the first pixel, and
the third pixel displays an (N−1)-th portion of the right image corresponding to an (N−1)-th position in the right image.

10. The display apparatus of claim 1, wherein the display panel further comprises a third pixel adjacent to the first pixel, and
the third pixel displays an (N−2)-th portion of the right image corresponding to an (N−2)-th position in the right image.

11. The display apparatus of claim 1, wherein the display panel further comprises a third pixel adjacent to the first pixel, and
the third pixel displays an (N−3)-th portion of the right image corresponding to an (N−3)-th position in the right image.

12. The display apparatus of claim 1, wherein the unit lens is a Fresnel lens including a plurality of divided lens areas, each of the plurality of divided lens areas including a plurality of lens electrodes.

13. The display apparatus of claim 1, further comprising a viewpoint detecting part detecting a viewpoint of the observer.

14. A method of displaying a three-dimensional ("3D") image, the method comprising:
displaying an N-th portion of a left image corresponding to an N-th position in the left image on a first pixel;
displaying an N-th portion of a right image corresponding to the N-th position in the right image on a second pixel, the second pixel being spaced apart from the first pixel with additional left image pixels and one or more additional right image pixels disposed between the second and first pixels;
directing the N-th left image to a left eye of an observer using a unit lens; and
directing the N-th right image to a right eye of the observer using the unit lens,
wherein N is a positive integer.

15. The method of claim 14, wherein a pixel cycle is a distance between pixels adjacent to each other in a first direction,
the second pixel is spaced apart from the first pixel by 2K+1 pixel cycles, and
K is a positive integer.

16. A method of displaying a three-dimensional ("3D") image, the method comprising:
displaying an N-th portion of a left image corresponding to an N-th position in the left image on a first pixel;
displaying an N-th portion of a right image corresponding to the N-th position in the right image on a second pixel, the second pixel being spaced apart from the first pixel with additional pixels disposed between the second and first pixels;
directing the N-th left image to a left eye of an observer using a unit lens; and
directing the N-th right image to a right eye of the observer using the unit lens,
wherein N is a positive integer,
wherein a pixel cycle is a distance between pixels adjacent to each other in a first direction,
wherein the second pixel is spaced apart from the first pixel by 2K+1 pixel cycles,
wherein K is a positive integer, wherein a range of a magnification M of the unit lens is:

$$\frac{IPD}{(2K+1+X)P} \le M \le \frac{IPD}{(2K+1-X)P},$$

and wherein IPD is a distance between the left eye and the right eye of the observer, P is the pixel cycle, and X is a tolerance constant of the pixel cycle.

17. The method of claim 16, wherein the magnification M of the unit lens is $$M = \frac{IPD}{(2K+1)P}.$$

18. The method of claim 16, wherein a focal length f of the unit lens is proportional to $$\frac{D}{M+1},$$

and

D is a distance from the left and right eyes of the observer to the liquid crystal lens.

19. The method of claim 16, wherein a lens cycle is a distance between the unit lenses adjacent to each other in the first direction, and a range of the lens cycle PL is $$2P\frac{M}{M+2} \le PL \le 2P\frac{3M}{3M+2}.$$

20. The method of claim 19, wherein the lens cycle PL is $$PL = 2P\frac{M}{M+1}.$$

21. The method of claim 14, wherein the unit lens is a Fresnel lens including a plurality of divided lens areas, each lens area including a plurality of lens electrodes.

22. The method of claim 14, further comprising:
detecting a viewpoint of the observer; and
adjusting the left image and the right image based on the detected viewpoint of the observer.

23. A display device comprising:
a display panel including a plurality of pixels displaying a plurality of frames of a three-dimensional image comprising a left-eye image and a right-eye image, wherein a pixel of the plurality of pixels displaying a portion of the left-eye image for a given frame is spaced apart from a pixel of the plurality of pixels displaying a corresponding portion of the right-eye image for the given frame such that one or more additional left image pixels and one or more additional right image pixels disposed between the pixel displaying the portion of the left-eye image for the given frame and the pixel displaying the corresponding portion of the right-eye image for the given frame; and
a liquid crystal lens directing the left-eye image to a left eye of a viewer and directing the right-eye image to a right eye of the viewer.

24. The display apparatus of claim 3, wherein X is ⅔.

25. The display apparatus of claim 16, wherein X is ⅔.

* * * * *